United States Patent
Muehlmann et al.

(10) Patent No.: US 8,896,690 B2
(45) Date of Patent: Nov. 25, 2014

(54) IMAGE ACQUISITION SYSTEM AND METHOD FOR DISTANCE DETERMINATION USING AN IMAGE RECORDING SYSTEM

(75) Inventors: Karsten Muehlmann, Stuttgart (DE); Alexander Wuerz-Wessel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1398 days.

(21) Appl. No.: 12/300,731

(22) PCT Filed: Apr. 10, 2007

(86) PCT No.: PCT/EP2007/053441
§ 371 (c)(1),
(2), (4) Date: Apr. 17, 2009

(87) PCT Pub. No.: WO2007/144213
PCT Pub. Date: Dec. 21, 2007

(65) Prior Publication Data
US 2009/0322872 A1    Dec. 31, 2009

(30) Foreign Application Priority Data

Jun. 12, 2006  (DE) .......................... 10 2006 027 121

(51) Int. Cl.
| | |
|---|---|
| H04N 7/18 | (2006.01) |
| H04N 5/235 | (2006.01) |
| G06T 7/00 | (2006.01) |
| G06K 9/00 | (2006.01) |
| G01S 11/12 | (2006.01) |

(52) U.S. Cl.
CPC .............. *H04N 5/235* (2013.01); *G06T 7/0071* (2013.01); *G06K 9/00791* (2013.01); *G01S 11/12* (2013.01)

USPC ........... 348/142; 348/118; 348/148; 382/106; 382/154; 382/210

(58) Field of Classification Search
USPC ........... 348/118, 148, 142; 382/106, 154, 210
See application file for complete search history.

(56) References Cited

U.S. PATENT DOCUMENTS

| 4,257,703 A | 3/1981 | Goodrich |
| 5,521,633 A | 5/1996 | Nakajima et al. |
| 6,114,951 A | 9/2000 | Kinoshita et al. |
| 7,124,027 B1 * | 10/2006 | Ernst et al. .................... 701/301 |
| 2002/0039187 A1 * | 4/2002 | Keranen ....................... 356/604 |
| 2002/0047901 A1 * | 4/2002 | Nobori et al. ................. 348/149 |
| 2002/0101360 A1 * | 8/2002 | Schrage ....................... 340/901 |

(Continued)

FOREIGN PATENT DOCUMENTS

| DE | 4332612 | 4/1994 |
| DE | 10301898 | 8/2004 |

OTHER PUBLICATIONS

International Search Report, PCT International Patent Application No. PCT/EP2007/054331, dated Feb. 26, 2008.

(Continued)

*Primary Examiner* — Thuong Nguyen
(74) *Attorney, Agent, or Firm* — Kenyon & Kenyon LLP

(57) ABSTRACT

A vehicle-based image acquisition system having an image sensor that has a characteristic curve assembled from linear segments. The system includes an arrangement for determining the distance of luminous objects imaged by the image sensor.

20 Claims, 2 Drawing Sheets

(56) References Cited

U.S. PATENT DOCUMENTS

| | | | | |
|---|---|---|---|---|
| 2002/0154032 | A1* | 10/2002 | Hilliard et al. | 340/933 |
| 2004/0136568 | A1* | 7/2004 | Milgram et al. | 382/104 |
| 2004/0207652 | A1* | 10/2004 | Ratti et al. | 345/697 |
| 2004/0213463 | A1* | 10/2004 | Morrison | 382/210 |
| 2006/0216674 | A1* | 9/2006 | Baranov et al. | 434/29 |
| 2006/0228024 | A1 | 10/2006 | Franz et al. | |
| 2007/0031006 | A1* | 2/2007 | Leleve et al. | 382/104 |
| 2007/0115357 | A1* | 5/2007 | Stein et al. | 348/148 |
| 2007/0263096 | A1* | 11/2007 | Bouzar | 348/208.3 |
| 2009/0295920 | A1* | 12/2009 | Simon | 348/148 |

OTHER PUBLICATIONS

Xu S B: "Qualitative depth from monoscopic cues" Image Processing and Its Applications, 1992, International Conference on Maastricht, Netherlands, London, UK, IEE, UK, 1992, pp. 437-440, XP006500210.

Wei-Ge Chen et al: "Investigating New Visual Cue for Image Motions Estimation Motion-from-Smear" Proceedings of the International Conference on Image Processing (ICIP) Austin, Nov. 13-16, 1994, Los Alamitos, IEEE Comp. Soc. Press, US, Bd. vol. 3 Conf. 1, Nov. 13, 1994, pp. 761-765 XP000522900.

Rekleitis I M ED—Institute of Electrical and Electronics Engineers: "Optical flow recognition from the power spectrum of a single blurred image" Proceedings of the International Conference on Image Processing (ICIP) Lausanne, Sep. 16-19, 1996, New York, IEEE, US, Bd. vol. 1, Sep. 16, 1996, pp. 791-794, XP010202513.

\* cited by examiner

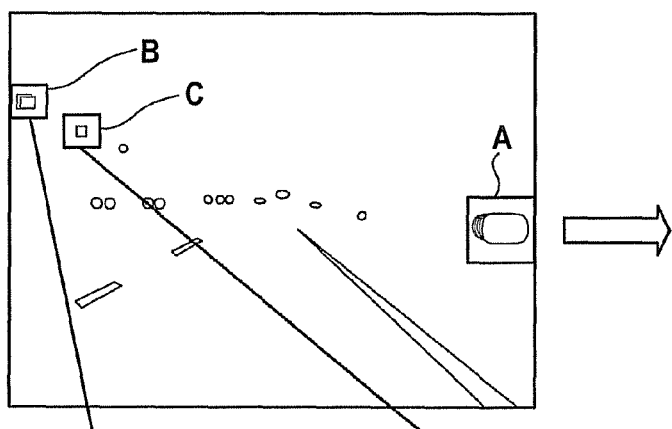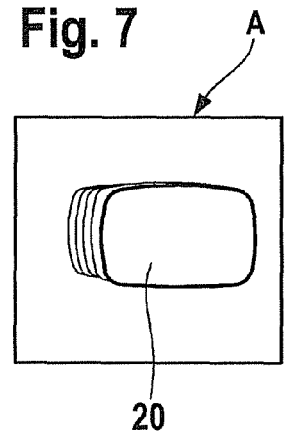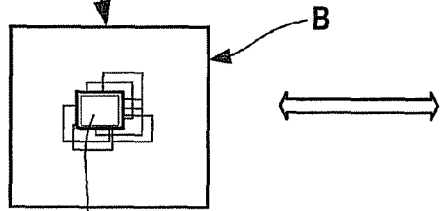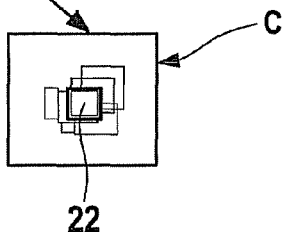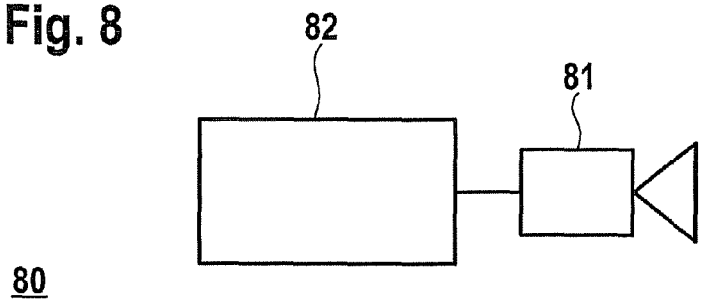

IMAGE ACQUISITION SYSTEM AND METHOD FOR DISTANCE DETERMINATION USING AN IMAGE RECORDING SYSTEM

FIELD OF THE INVENTION

The present invention relates to an image acquisition system and a method for distance determination between an image acquisition system and a luminous object moving relative to the image acquisition system.

BACKGROUND INFORMATION

An image acquisition system may be used in motor vehicles in order to obtain images of the vehicle's surroundings and, in connection with a driver assistance system, to make it easier for the driver to manage the vehicle. An image acquisition system of this kind encompasses at least one image sensor and an optical system, associated with said image sensor, that images onto the image sensor an imaged field of the vehicle's surroundings. One task of any such driver assistance system is precise measurement of distance, since it is only with a knowledge of accurate distance values that optically based lane and distance monitoring systems, having functions such as, for example, lane departure warning (LDW) and lane keeping support (LKS), can function with sufficient reliability. Conventionally, image acquisition systems using two cameras that generate a stereo image pair of an object may be used, the contents of one image being slightly shifted with respect to the other image. This shift is referred to as a disparity. If the arrangement of the cameras is known, the distance of the object from the cameras can be deduced from the measured disparity. With an image acquisition system having only one image sensor, however, the disparity can no longer be readily determined, since no stereo image is generated. The image sensors used with image acquisition systems of this kind must process a wide range of illumination intensities so that they can still supply usable output signals on the one hand in bright sunlight and on the other hand in dimly illuminated tunnels. Whereas with conventional image sensors the exposure sensitivity often follows a preset linear or logarithmic characteristic curve, image sensors have been described, for example, in German Patent Application No. DE 103 01 898 A1, in which this characteristic curve is individually adjustable in individual linear segments. A characteristic curve of this kind correlates the absolute brightness of an object with the grayscale value in the image obtained of the object.

German Patent No. DE 4332612 A1 describes an external viewing method for motor vehicles that is characterized by the following steps: acquiring an external view from the driver's own motor vehicle, which is moving; sensing a motion of an individual point in two images as an optical flow, one of the two images being acquired at an earlier point in time and the other of the two images at a later point in time; and monitoring a correlation of the driver's own motor vehicle with respect at least to either a preceding motor vehicle or an obstacle on the road, a hazard level being evaluated as a function of a magnitude and a location of a vector of an optical flow that is derived from a point on at least the preceding motor vehicle, the following motor vehicle, or the obstacle on the road. Taking into account the fact that the optical flow becomes greater as the distance from the driver's own vehicle to the preceding motor vehicle or obstacle becomes smaller, or as the relative velocity becomes greater, this conventional method is therefore designed so that the hazard can be evaluated on the basis of the magnitude of an optical flow that is derived from a point on a preceding motor vehicle or on an obstacle on the road. It is therefore not particularly necessary to install a distance measuring instrument in order to measure the distance to a preceding motor vehicle.

SUMMARY

An object of the present invention is to improve the performance of an onboard image acquisition system interacting with a driver assistance system.

This object may be achieved by an example image acquisition system having an image sensor that has a characteristic curve assembled from linear segments, which determine the distance of luminous objects imaged by the image sensor.

An example method for determining the distance between an image acquisition system encompassing an image sensor and a luminous object moving relative to the image acquisition system, includes:
- with the image sensor, an image of the surroundings of the image sensor encompassing luminous objects is generated;
- from the image generated by the image sensor, luminous objects of interest are selected;
- for the selected objects, the tailing of the image of the luminous objects, which tailing occurs as a consequence of the control properties of the image sensor and the relative velocity between the image sensor and the luminous objects, is sensed;
- the magnitude of the tailing is associated with a distance value.

The present invention may make possible a determination of the distance of an object that has been imaged by an image acquisition system having only one image sensor using monoscopic technology. The example embodiment of the present invention exploits in this context the recognition that when a luminous object is imaged with an image sensor having a characteristic curve that is linear in segments, "smearing" or tailing occurs in the image of the object. The closer the luminous object is to the image sensor, the greater this smearing. Luminous objects of interest are, in particular, the lights of motor vehicles, such as the taillights of preceding motor vehicles or the headlights of motor vehicles approaching from the opposite direction. For night driving or when viewing conditions are poor because of weather, the aforesaid lights are often the only parts of other vehicles that are in any way detectable. With the present invention, it may be possible to determine the distance of these lights from the image sensor of the vehicle, and thus also to enable an assessment of risk. The closer a luminous object is located to the motor vehicle, the greater the potential risk of a collision.

BRIEF DESCRIPTION OF THE DRAWINGS

The present invention is explained below with reference to example embodiments depicted in the figures.

FIG. 4 again shows the image already depicted in FIG. 3, with three luminous objects identified by borders.

FIG. 5 is an enlarged depiction of the luminous object identified by frame B in FIG. 4.

FIG. 6 is an enlarged depiction of the luminous object identified by frame C in FIG. 4.

FIG. 7 is an enlarged depiction of the luminous object identified by frame A in FIG. 4.

FIG. 8 is a block diagram of an image acquisition system.

EXAMPLE EMBODIMENTS OF THE PRESENT INVENTION

Figure 1:
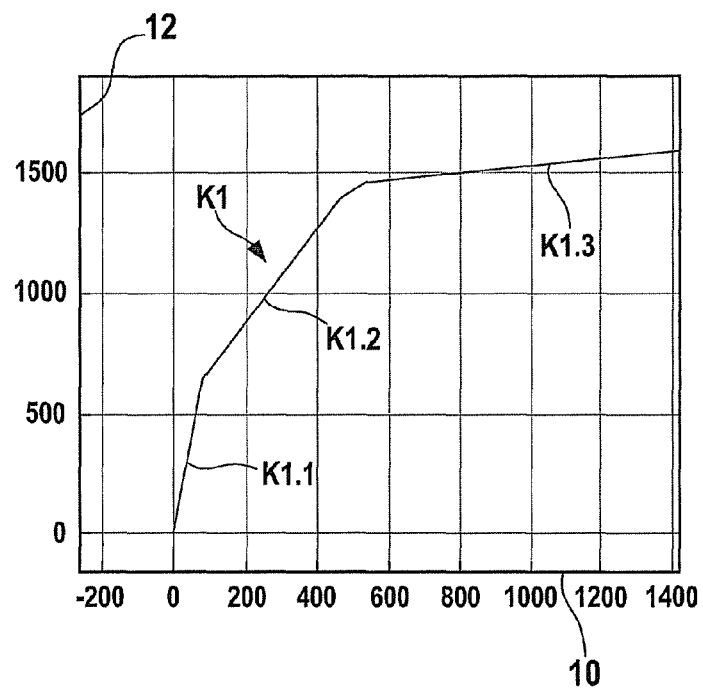
FIG. 1 shows the characteristic curve of an image sensor of an image acquisition system.

An example embodiment of the invention is described below. It proceeds from an, in particular, vehicle-based image acquisition system having only one image sensor, preferably a CMOS camera. The example embodiment of the present invention further proceeds from the fact that for optimum utilization of the performance of the CMOS camera used as an image sensor, a characteristic curve that is linear in segments is used. A characteristic curve K1 of this kind is depicted by way of example in FIG. 1. The diagram represents the exposure sensitivity of one pixel of the image sensor. Exposure 10 is plotted on the abscissa of the diagram in arbitrarily defined virtual units from −200 to 1400, exposure 10 being, for example, an indication of the irradiation intensity or illumination intensity. Output signal 12 of the pixel of the image sensor is plotted on the ordinate of the diagram as an arbitrarily defined virtual unit from 0 to 1500. Output signal 12 can be present as a digital or analog signal. Characteristic curve K1 shown in FIG. 1 encompasses three linear segments K1.1, K1.2, K1.3 having different slopes. Characteristic curve K1 correlates the absolute brightness of an object with the grayscale value in the image obtained of the object. The fact that characteristic curve K1 is linear in segments, with different slopes for the segments, results in differing exposure times for corresponding object brightnesses. As a consequence, a "tailing" (smearing) can be observed at night with bright objects when the image acquisition system is moving relative to a luminous object. Luminous objects of interest are, in particular, the lights of motor vehicles, such as the taillights of preceding motor vehicles or the headlights of motor vehicles approaching from the opposite direction. For night driving or when viewing conditions are poor because of weather, the aforesaid lights are often the only parts of other vehicles that are in any way detectable. With the present invention it is thus possible to determine the distance of these lights from the image sensor of the vehicle, and thus also to enable an assessment of risk. The closer a luminous object is located to the own motor vehicle, the greater the potential risk of a collision. With a monoscopic camera, the metric distance of an object cannot be measured directly, but can be ascertained only using auxiliary constructs. This can be done, for example, by calculating the distance via the intrinsic calibration (camera principal point, focal length, and distortion parameters if applicable), the extrinsic calibration (camera height, installation pitch angle with respect to road surface), a surface mensuration, or alternatively assuming a flat road and with a determination of the object's lower edge in the image. Errors in one of these values have a direct effect on the metric distance determination. Determination of the lower edge of an object in the image presents the greater difficulties, depending on illumination conditions and uncertainty in surface estimation. In sequences of monocular images, however, a temporal distance of the object can be inferred by scaling a sensed object. On the basis of two successive images, the acquisition time interval $\Delta t$ of the images and the change in the relative size of the object sc (=scale change) can thus be used to infer the so-called time to adjacency (tta):

$$tta = \Delta t/(sc-1.0).$$

Figure 2:
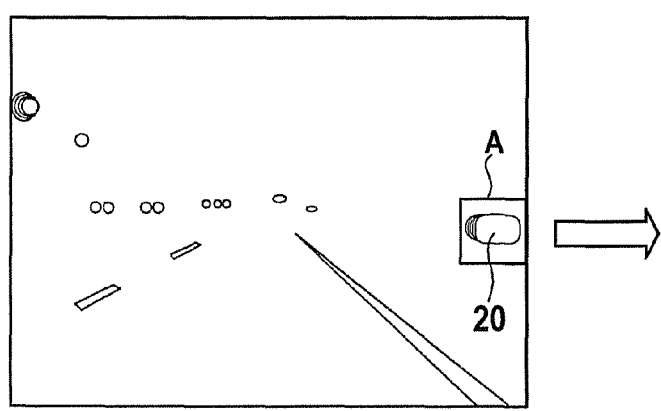
FIG. 2 shows an image, acquired at night by an image acquisition system, of a traffic area with luminous objects.
Figure 3:
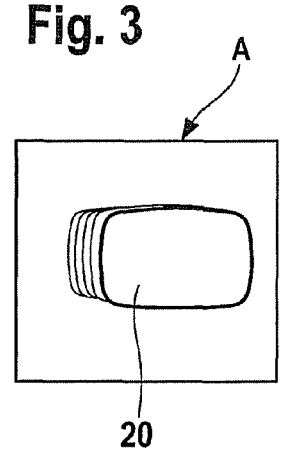
FIG. 3 is an enlarged depiction of the object enclosed by frame A in FIG. 2.

The value sc=1 means that no change in size is taking place. It is at precisely this point that tailing (smearing over time) and the camera control parameters come into play. The integration times of the pixels enters into the calculation of $\Delta t$. The tailing, i.e., the geometry of the smearing, enters into the change in relative size. The aforementioned smearing of a sensed luminous object represents, in principle, an image of the object's motion during the acquisition time. This motion is usually determined in image sequences by correlating corresponding image features, and is referred to as "optical flow." If the vehicle speed is known, the distance of an object sensed by the image acquisition system can be determined on the basis of this optical flow. Instead of determining the optical flow from an image sequence, here the optical flow can be measured directly. The control times and control thresholds of the image acquisition system can be used to infer the relative distance of the object, and also to perform a risk assessment. For example, a greater risk can be inferred in the context of a closer object. The tailing or "smearing" in the context of sensing of a luminous object with the image sensor of the image acquisition system is explained below with reference to FIG. 2 and FIG. 3. FIG. 2 shows an image acquired by an image acquisition system, at night, of a traffic area with luminous objects. The traffic area is a road having multiple travel lanes. Lane markings are still detectable by the light of the vehicle's headlights. Multiple narrowly delimited luminous objects are detectable in the image, these being vehicle-associated light sources such as, for example, taillights or headlights. One selected luminous object is labeled with the reference number 20 in FIG. 2 and is shown in enlarged fashion, together with a subregion A of the image surrounding it, in FIG. 3. It is evident from the enlarged depiction in FIG. 3 that luminous object 20 is not sharply imaged, but exhibits tailing or "smearing." This tailing is attributable to the properties of the image sensor and to the relative motion between luminous object 20 and the image sensor of the image acquisition system. FIG. 4 again shows the image already depicted in FIG. 3, multiple subregions A, B, C of the image that contain a luminous object now being emphasized and depicted in enlarged fashion in FIGS. 5, 6, and 7. Subregion A in turn contains luminous object 20 already shown in FIG. 3 and depicted again in FIG. 7. Subregion B contains luminous object 21, and subregion C contains luminous object 22. A comparison of luminous objects 20, 21, 22 shows that luminous object 20 exhibits the greatest tailing or smearing. Luminous object 21 has less tailing than luminous object 20. Luminous object 22, by contrast, exhibits the least tailing. It can be deduced therefrom that luminous object 20 is closest to the image sensor of the image acquisition system. Luminous object 22 is the one farthest away from the image sensor. Luminous object 21 is located farther than luminous object 20 from the image sensor, but is closer to it than luminous object 22. In the context of a risk consideration derived therefrom, it might therefore be concluded that the greatest risk potential proceeds from luminous object 20 or from the other vehicle carrying luminous object 20, since it is located at the closest proximity to the own vehicle. The respective degree of tailing can usefully be determined by way of windows of variable size that enclose the luminous objects of interest.

FIG. 8 additionally depicts, in the form of a block diagram, an image acquisition system 80 that, for example, is a component of a driver assistance system of a vehicle or coacts with such a driver assistance system. Image acquisition system 80 encompasses an image sensor 81 that is preferably a CMOS camera using monoscopic technology. Image sensor 81 is connected to a control device 82 that processes the image signals of image sensor 81. The information obtained by way of the example embodiment of the present invention regarding the distance of a luminous object 20, 21, 22 can advantageously be utilized for functions of a driver assistance system such as distance control, LDW, LKS, and lane change assistant (LCA).

What is claimed is:

1. A method for determining the distance between an image acquisition system encompassing an image sensor and a luminous object moving relative to the image acquisition system, the method comprising:
generating, using the image sensor, an image of surroundings of the image sensor encompassing a luminous object;
after the image has been generated, selecting at least one luminous object of interest from the image generated by the image sensor;
for the selected luminous object, sensing a tailing of the image of the selected luminous object, where tailing occurs as a consequence of control properties of the image sensor and a relative velocity between the image sensor and the luminous object; and
associating a magnitude of the tailing with a distance value;
wherein from an acquisition time interval of the images of the sensor, and from a change in a relative size of the object in the image, a time to adjacency is determined based on an acquisition time interval of the images and a scale change.

2. The method as recited in claim 1, wherein the extent of the tailing is sensed by way of a window enclosing the image of the luminous object.

3. The method as recited in claim 1, wherein a greatest tailing is associated with a shortest distance value.

4. The method as recited in claim 1, wherein a risk assessment is carried out as a function of the tailing.

5. The method as recited in claim 1, wherein the extent of the tailing is sensed by way of a window enclosing the image of the luminous object, wherein a greatest tailing is associated with a shortest distance value, and wherein a risk assessment is carried out as a function of the tailing.

6. A method for determining the distance between an image acquisition system encompassing an image sensor and a luminous object moving relative to the image acquisition system, the method comprising:
generating, using the image sensor, an image of surroundings of the image sensor encompassing a luminous object;
selecting a luminous object of interest from the image generated by the image sensor;
for the selected object, sensing a tailing of the image of the luminous object, which tailing occurs as a consequence of control properties of the image sensor and a relative velocity between the image sensor and the luminous object; and
associating a magnitude of the tailing with a distance value;
wherein from an acquisition time interval of the images of the sensor, and from a change in a relative size of the object in the image, a time to adjacency is determined according to the following equation:

$$tta=\Delta t/(sc-1.0),$$

where
tta=time to adjacency;
$\Delta t$=acquisition time interval of the images;
sc=scale change (change in relative size of the object in the image).

7. The method as recited in claim 6, wherein the extent of the tailing is sensed by way of a window enclosing the image of the luminous object.

8. The method as recited in claim 6, wherein a greatest tailing is associated with a shortest distance value.

9. The method as recited in claim 6, wherein a risk assessment is carried out as a function of the tailing.

10. The method as recited in claim 6, wherein the extent of the tailing is sensed by way of a window enclosing the image of the luminous object, wherein a greatest tailing is associated with a shortest distance value, and wherein a risk assessment is carried out as a function of the tailing.

11. An image acquisition system for determining the distance to a luminous object moving relative to the image acquisition system, comprising:
an image sensor for generating an image of surroundings of the image sensor encompassing a luminous object and selecting at least one luminous object of interest from the generated image after the image has been generated;
wherein for the selected luminous object, a tailing of the image of the selected luminous object, where tailing occurs as a consequence of control properties of the image sensor and a relative velocity between the image sensor and the luminous object is sensed, and
wherein a magnitude of the tailing is associated with a distance value;
wherein from an acquisition time interval of the images of the sensor, and from a change in a relative size of the object in the image, a time to adjacency is determined based on an acquisition time interval of the images and a scale change.

12. The system of claim 11, wherein the extent of the tailing is sensed by a window enclosing the image of the luminous object.

13. The system of claim 11, wherein a greatest tailing is associated with a shortest distance value.

14. The system of claim 11, wherein a risk assessment is performed as a function of the tailing.

15. The system of claim 11, wherein the extent of the tailing is sensed by a window enclosing the image of the luminous object, wherein a greatest tailing is associated with a shortest distance value, and wherein a risk assessment is performed as a function of the tailing.

16. An image acquisition system for determining the distance to a luminous object moving relative to the image acquisition system, comprising:
an image sensor for generating an image of surroundings of the image sensor encompassing a luminous object and selecting a luminous object of interest from the generated image;
wherein for the selected object, a tailing of the image of the luminous object, which tailing occurs as a consequence of control properties of the image sensor and a relative velocity between the image sensor and the luminous object is sensed,
wherein a magnitude of the tailing is associated with a distance value, and
wherein from an acquisition time interval of the images of the sensor, and from a change in a relative size of the object in the image, a time to adjacency is determined according to the following equation: $tta=\Delta t/(sc-1.0)$, where tta=time to adjacency, $\Delta t$=acquisition time interval of the images; and sc=scale change (change in relative size of the object in the image).

17. The system of claim 16, wherein the extent of the tailing is sensed by a window enclosing the image of the luminous object.

18. The system of claim 16, wherein a greatest tailing is associated with a shortest distance value.

19. The system of claim 16, wherein a risk assessment is performed as a function of the tailing.

20. The system of claim 16, wherein the extent of the tailing is sensed by a window enclosing the image of the luminous object, wherein a greatest tailing is associated with a shortest distance value, and wherein a risk assessment is performed as a function of the tailing.

* * * * *